(12) United States Patent
Chen et al.

(10) Patent No.: US 9,337,920 B2
(45) Date of Patent: May 10, 2016

(54) CABINET WITH POWER SUPPLY ARRANGEMENT

(71) Applicants: Kung-Cheng Chen, Taichung (TW); Lung-Chuan Huang, Taichung (TW)

(72) Inventors: Kung-Cheng Chen, Taichung (TW); Lung-Chuan Huang, Taichung (TW)

(73) Assignee: E-MAKE CO., LTD., Taichung (TW)

( * ) Notice: Subject to any disclaimer, the term of this patent is extended or adjusted under 35 U.S.C. 154(b) by 203 days.

(21) Appl. No.: 14/316,782

(22) Filed: Jun. 26, 2014

(65) Prior Publication Data

US 2015/0380909 A1 Dec. 31, 2015

(51) Int. Cl.
*H02B 1/44* (2006.01)
*H04B 7/24* (2006.01)
*H02B 1/044* (2006.01)

(52) U.S. Cl.
CPC . *H04B 7/24* (2013.01); *H02B 1/044* (2013.01)

(58) Field of Classification Search
CPC ............. H02B 1/306; H02B 1/52; H02B 7/24
See application file for complete search history.

(56) References Cited

U.S. PATENT DOCUMENTS

| | | | | |
|---|---|---|---|---|
| 6,726,509 B2 * | 4/2004 | Milan | ................. | G06F 13/4095 439/284 |
| 7,140,922 B2 * | 11/2006 | Luu | ..................... | H01R 31/065 439/651 |
| 7,141,891 B2 * | 11/2006 | McNally | ................ | G06F 1/206 307/39 |
| 7,358,625 B2 * | 4/2008 | Cheng | ................ | H01R 13/6675 307/18 |
| 7,663,866 B2 * | 2/2010 | Lee | ....................... | H01R 13/652 307/117 |
| 7,997,925 B2 * | 8/2011 | Lam | ..................... | H01R 13/665 174/66 |
| 8,188,713 B2 * | 5/2012 | Lee | .................... | H01R 13/6675 320/111 |
| 8,384,348 B2 * | 2/2013 | Tin | ........................ | H02J 7/0052 307/140 |
| 8,994,330 B2 * | 3/2015 | Kuo | ..................... | H01R 25/003 320/111 |
| 9,041,865 B2 * | 5/2015 | McClymonds | ........ | H04N 5/268 348/14.08 |
| 9,074,761 B2 * | 7/2015 | Liao | ..................... | H02J 7/0042 |
| 9,153,997 B2 * | 10/2015 | Liao | ...................... | H02J 7/0042 |
| 2003/0141840 A1 * | 7/2003 | Sanders | ................ | H02J 7/0042 320/107 |
| 2008/0012423 A1 * | 1/2008 | Mimran | ............... | H01R 25/003 307/11 |
| 2010/0231161 A1 * | 9/2010 | Brown | ..................... | B25H 3/02 320/101 |
| 2012/0078413 A1 * | 3/2012 | Baker, Jr. | ................. | G07F 17/12 700/232 |
| 2013/0132307 A1 * | 5/2013 | Phelps | .................. | H02J 7/0027 705/412 |
| 2014/0312691 A1 * | 10/2014 | Doljack | ................ | H02J 7/0036 307/29 |
| 2015/0280472 A1 * | 10/2015 | Hohl | ..................... | H02J 7/0044 320/111 |

* cited by examiner

*Primary Examiner* — Robert J Hoffberg

(57) ABSTRACT

A cabinet is provided with a housing releasably mounted on one side of the cabinet and including a power cord having an AC power plug for connecting to an external power source; and a power supply module electrically connected to the power cord and disposed in the housing, the power supply module including at least one socket disposed on a top of the housing so that one or more electronic devices can be connected thereto for charging.

7 Claims, 4 Drawing Sheets

CABINET WITH POWER SUPPLY ARRANGEMENT

BACKGROUND OF THE INVENTION

1. Field of the Invention

The invention relates to cabinet with power supply arrangement and more particularly to a cabinet having a power supply arrangement so that one or more electronic devices can be connected thereto for charging.

2. Description of Related Art

A cabinet typically has a plurality of drawers and a person can draw out the drawer horizontally to access its contents. It is typical for an electronic device (e.g., a mobile phone or tablet computer) user to connect a plug of the device to an outlet for charge if a rechargeable battery of the device is depleted. Further, it is often that the electronic device users have difficulties of finding an outlet for charging. Furthermore, an extension cord may be required to interconnect the device and the outlet and finding a suitable extension cord may be difficult or even impossible when such need arises.

Thus, the need for improvement still exists.

SUMMARY OF THE INVENTION

It is therefore one object of the invention to provide a cabinet comprising a housing releasably mounted on one side of the cabinet and including a power cord having an AC power plug for connecting to an external power source; and a power supply module electrically connected to the power cord and disposed in the housing, the power supply module including at least one socket disposed on a top of the housing.

The above and other objects, features and advantages of the invention will become apparent from the following detailed description taken with the accompanying drawings.

DETAILED DESCRIPTION OF THE INVENTION

Figure 1:
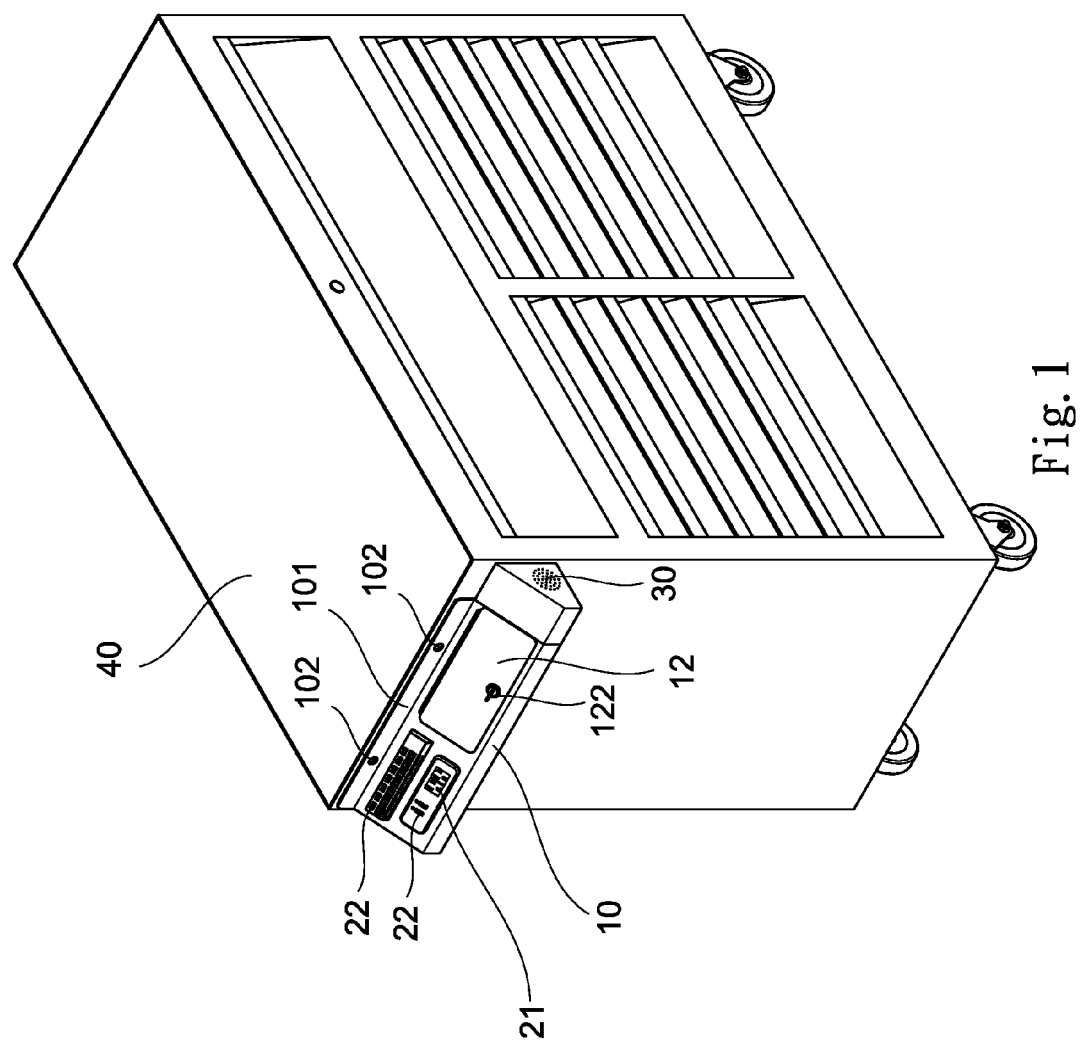
FIG. 1 is a perspective view of a cabinet according to the invention.
Figure 2:
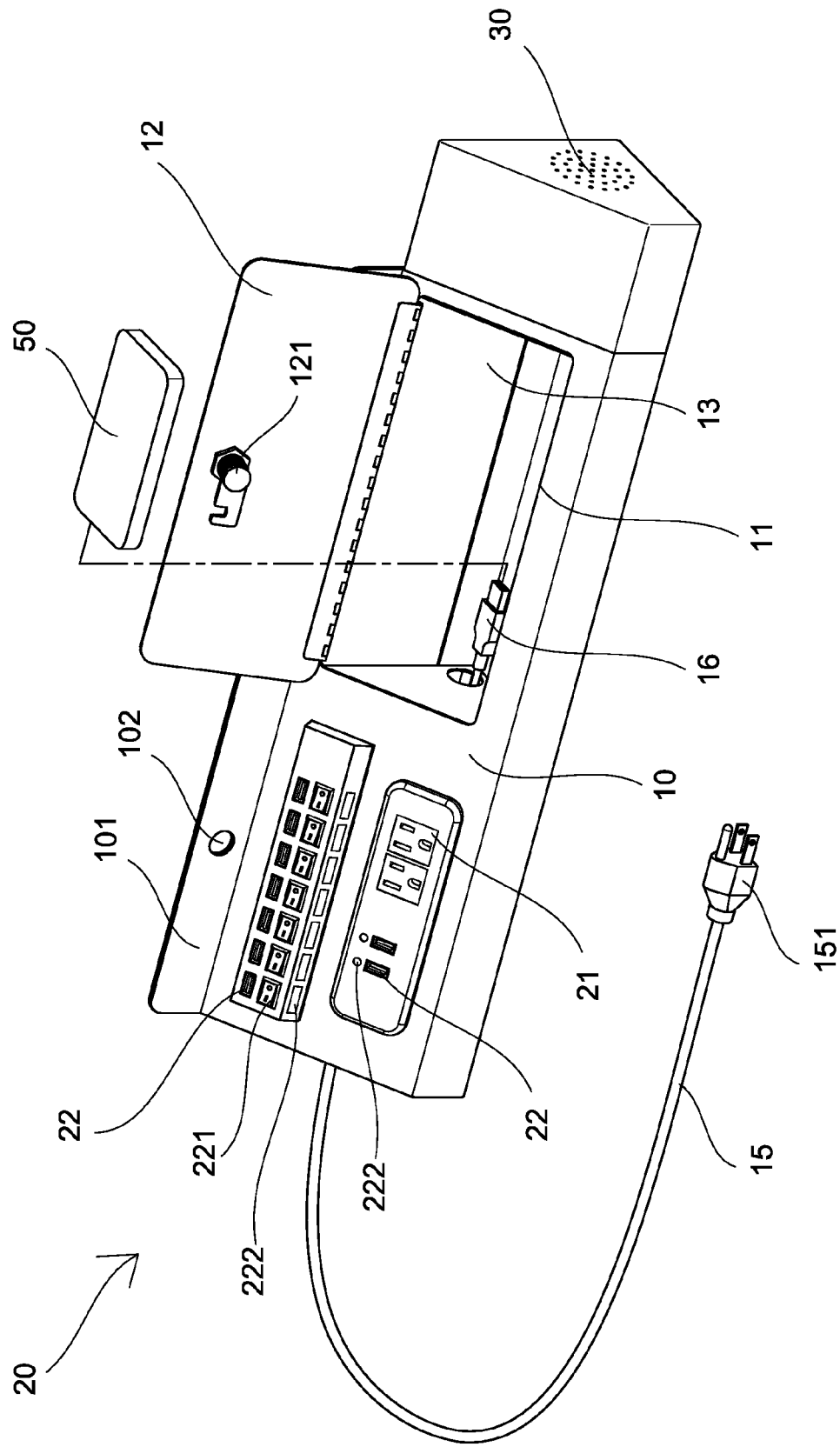
FIG. 2 is an exploded perspective view of the power supply arrangement.
Figure 3:
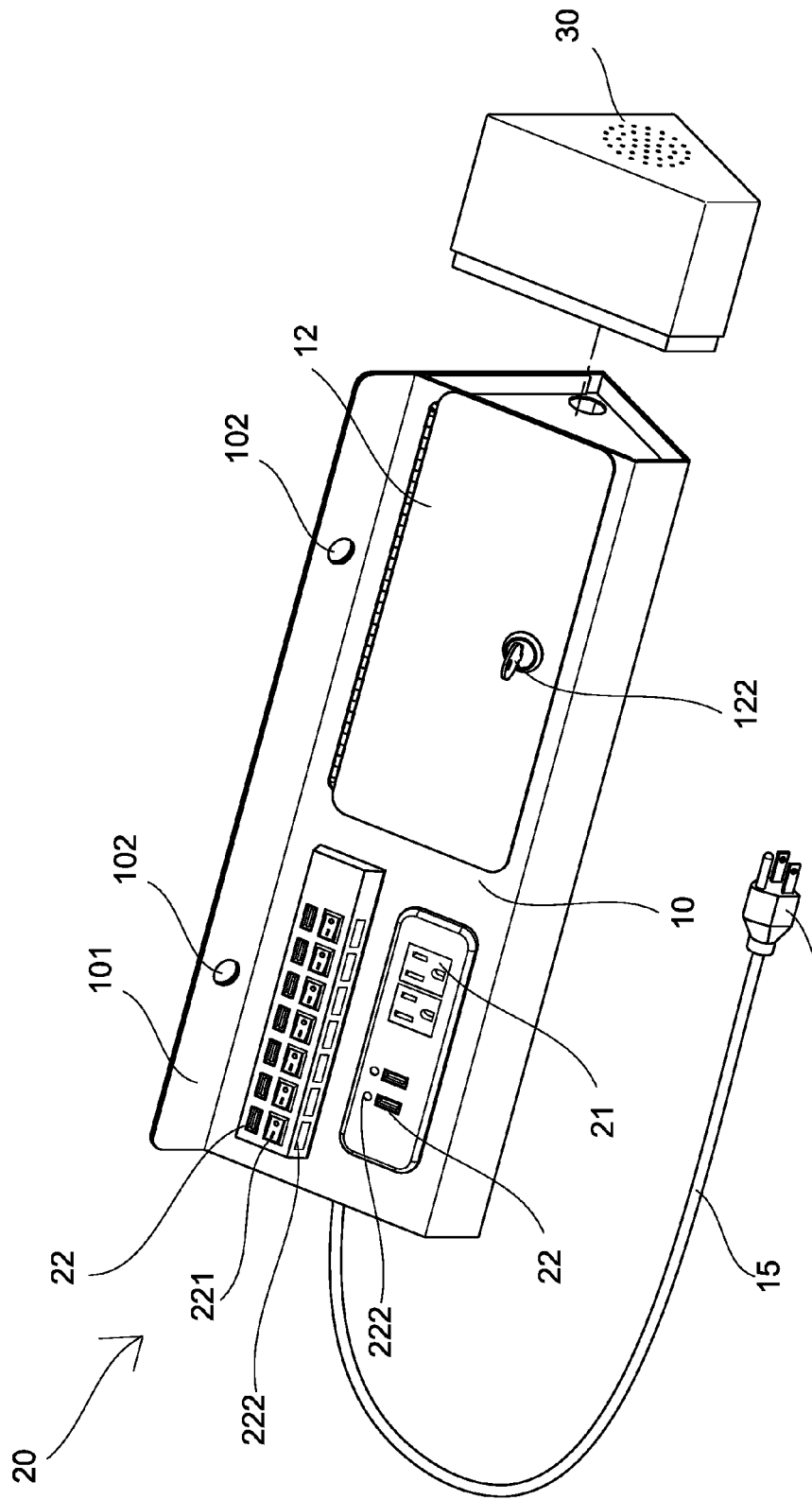
FIG. 3 is a perspective view of the power supply arrangement.
Figure 4:
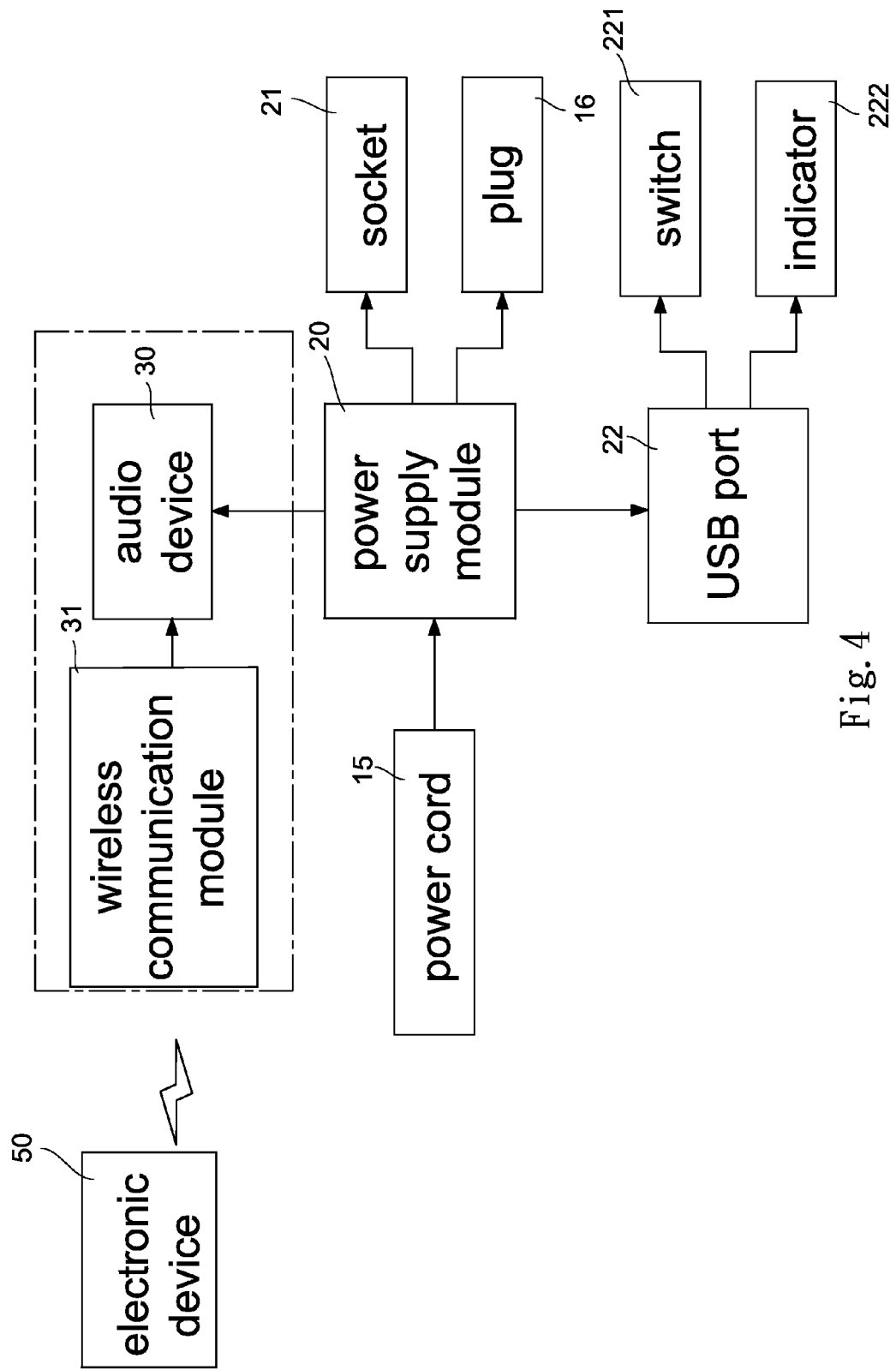
FIG. 4 is a block diagram of the power supply arrangement.

Referring to FIGS. 1 to 4, a cabinet 40 in accordance with the invention comprises the following components as discussed in detail below.

A housing 10 is mounted on one side of the cabinet 40. A power supply module 20 is mounted to the left portion of the housing 10 and an audio device 30 is releasably mounted to the right side of the housing 10 (see FIG. 2). The housing 10 is elongated and has a trapezoidal longitudinal section. It is noted that other shapes of the housing 10 are possible within the scope of the invention.

The housing 10 includes a rectangular mounting plate 101 on a top edge proximate to the cabinet 40, and two spaced holes 102 through the mounting plate 101 so that the housing 10 can be releasably mounted on the housing 10 by, for example, two fasteners driven through the holes 102 into the housing 10. The housing 10 further includes an opening 11 between the power supply module 20 and the audio device 30, a cover 12 hingedly provided on the opening 11, a lock 121 provided on the cover 12 and the lock 121 can be opened or closed by inserting a key 122 into a keyhole in the cover 12 and clockwise or counterclockwise turning the key 122, a compartment 13 formed directly below the opening 11 and the cover 12, a plug 16 provided in the compartment 13 and electrically connected to the power supply module 20.

An electronic device (e.g., computer, smart phone, tablet computer, notebook computer, or battery charger) 50 can be disposed in the compartment 13. The electronic device 50 has a BLUETOOTH module for wireless communications and a charging socket to allow the plug 16 to insert into for charging the electronic device 50. A power cord 15 has one end connected to the power supply module 20 and the other end formed as an AC (alternating current) power plug 151 for connecting to an external power source (e.g., AC power).

The power supply module 20 includes a plurality of (two are shown) sockets 21, a plurality of USB (Universal Serial Bus) ports 22, a plurality of switches 221 corresponding to some USB ports 22 respectively, and a plurality of indicators 222 each corresponding to the USB port 22. The sockets 21 and the USB ports 22 are provided on a top surface of the power supply module 20. One or more electronic devices 50 can alternatively electrically connected to the socket(s) 21 and/or the USB port(s) 22. Further, angled orientation of the sockets 21 and the USB ports 22 facilitates the electrical connection. The USB ports 22 can supply 5 V, 2.1 A power to the connected electronic devices 50 so that a charging time can be decreased greatly.

The switch 221 can be closed or open to turn on or off power supply to the USB port 22. The indicators 222 are electrically connected to the USB ports 22. Thus, the indicator 222 is lit as an indication of electrical connection when the electronic device 50 is connected to the USB port 22 and the switch 221 is closed. The audio device 30 is releasably mounted to the right side of the housing 10 (see FIG. 2) and is electrically connect to the power supply module 20. The audio device 30 includes a wireless communication module 31 so that the audio device 30 can be electrically connected to the electronic device 50 by means of BLUETOOTH technology. Thus, sound made by the audio device 30 can broadcast. Further, the provision of the audio device 30 is convenient for use and can increase applications of the cabinet 40.

In use, a user may place an electronic device 50 in the compartment 13 and insert the plug 16 into a charging socket of the electronic device 50 for charging.

While the invention has been described in terms of preferred embodiments, those skilled in the art will recognize that the invention can be practiced with modifications within the spirit and scope of the appended claims.

What is claimed is:

1. A cabinet comprising:
   a housing releasably mounted on an exterior side of the cabinet and including:
   a power cord having an AC (alternating current) power plug for connecting to an external power source;
   an opening in a top of the housing;
   a lockable cover pivotably provided on the opening;
   a compartment for an electronic device formed directly below both the opening and the cover;
   a power supply module electrically connected to the power cord and disposed in the housing, the power supply module including at least one DC (direct current) socket disposed on the top of the housing and power supply module converting AC of the external power source to DC; and a charging plug configured for charging the electronic device, the charging plug provided in the compartment and electrically connected to the power supply module.

2. The cabinet of claim 1, wherein the at least one DC socket comprises at least one USB (Universal Serial Bus) port disposed on the top of the housing.

3. The cabinet of claim 2, wherein the power supply module further comprises at least one switch each configured to be closed or open to turn on or off a power supply to a respective one of the at least one USB port.

4. The cabinet of claim 3, wherein the power supply module further comprises at least one indicator each electrically connected to the respective one of the at least one USB port so that one of the at least one indicator is lit as an indication of an electrical connection when the electronic device is connected to the one of the at least one USB port and a corresponding one of the at least one switch is closed.

5. The cabinet of claim 1, wherein the housing further comprises a mounting plate on a top edge proximate to the cabinet, and two spaced holes through the mounting plate.

6. The cabinet of claim 1, further comprising an audio device releasably mounted to one side of the housing.

7. The cabinet of claim 6, wherein the audio device includes a wireless communication module so that the audio device can be electrically connected to the electronic device by means of short-range wireless interconnection technology.

* * * * *